United States Patent
Nishikawa et al.

(10) Patent No.: US 10,566,857 B2
(45) Date of Patent: Feb. 18, 2020

(54) IRON CORE AND MOTOR

(71) Applicant: PANASONIC CORPORATION, Osaka (JP)

(72) Inventors: Yukio Nishikawa, Osaka (JP); Taihei Okada, Hyogo (JP); Tohru Kojima, Osaka (JP)

(73) Assignee: Panasonic Corporation, Osaka (JP)

(*) Notice: Subject to any disclaimer, the term of this patent is extended or adjusted under 35 U.S.C. 154(b) by 100 days.

(21) Appl. No.: 15/833,825

(22) Filed: Dec. 6, 2017

(65) Prior Publication Data
US 2018/0159389 A1    Jun. 7, 2018

(30) Foreign Application Priority Data

Dec. 6, 2016 (JP) ................. 2016-236319
Sep. 20, 2017 (JP) ................. 2017-180401

(51) Int. Cl.
*H02K 1/06* (2006.01)
*H02K 1/18* (2006.01)
*H02K 1/02* (2006.01)
*H02K 1/14* (2006.01)

(52) U.S. Cl.
CPC ............... *H02K 1/185* (2013.01); *H02K 1/02* (2013.01); *H02K 1/146* (2013.01)

(58) Field of Classification Search
CPC .......... H02K 1/02; H02K 1/146; H02K 1/148; H02K 1/185
See application file for complete search history.

(56) References Cited

U.S. PATENT DOCUMENTS

| | | | | |
|---|---|---|---|---|
| 6,323,571 B1* | 11/2001 | Nakahara | ................. | H02K 1/14 242/432 |
| 6,982,513 B2* | 1/2006 | Fujii | ..................... | H02K 1/185 310/254.1 |
| 8,823,235 B2* | 9/2014 | Watanabe | ........... | H01F 41/0293 310/156.32 |
| 2004/0061404 A1* | 4/2004 | Fujii | ..................... | H02K 1/185 310/254.1 |
| 2005/0089708 A1* | 4/2005 | Maruko | ................. | C22C 45/02 428/611 |
| 2008/0231138 A1* | 9/2008 | Onimaru | ................. | H02K 1/06 310/216.018 |
| 2010/0090555 A1* | 4/2010 | Tajima | ................. | H02K 1/2793 310/156.35 |

(Continued)

FOREIGN PATENT DOCUMENTS

JP    2014-155347 A    8/2014

*Primary Examiner* — Yuriy Semenenko
(74) *Attorney, Agent, or Firm* — McDermott Will & Emery LLP

(57) ABSTRACT

To provide an iron core and a motor for preventing reduction in motor drive efficiency. An iron core includes laminate section made up of a lamination of plural soft magnetic ribbons, fixed to metal substrate, and provided with winding, and fastening part that pressurizes laminate section in a lamination direction of soft magnetic ribbons. Also, the fastening part is disposed around an opening of through-hole that penetrates laminate section. Furthermore, a metal plate shaped so as not to cover winding section is provided between laminate section and fastening part. Besides, the motor includes a rotor and the iron core.

15 Claims, 6 Drawing Sheets

(56) References Cited

U.S. PATENT DOCUMENTS

| | | | | |
|---|---|---|---|---|
| 2011/0241455 A1* | 10/2011 | Yoshida | ............... | H02K 1/12 |
| | | | | 310/44 |
| 2015/0155810 A1* | 6/2015 | Yamada | ............. | H02K 19/12 |
| | | | | 318/400.02 |
| 2015/0326078 A1* | 11/2015 | Tanaka | ................ | C22C 38/00 |
| | | | | 310/156.01 |

* cited by examiner

IRON CORE AND MOTOR

CROSS REFERENCE TO RELATED APPLICATIONS

This application is entitled to and claims the benefit of Japanese Patent Application No. 2016-236319, filed on Dec. 6, 2016, and Japanese Patent Application No. 2017-180401, filed on Sep. 20, 2017, the disclosure of which including the specification, drawings and abstract is incorporated herein by reference in its entirety.

TECHNICAL FIELD

The present invention relates to an iron core and a motor using the iron core, and more particularly, to an iron core produced by laminating soft magnetic ribbons as well as to a motor using the iron core as a stator.

BACKGROUND ART

Conventionally, pure iron or magnetic steel sheets are used for a laminate of magnetic plates in a motor core (stator). Some motors aimed at greater efficiency use ribbons of an amorphous substance or nanocrystal grains for the iron core (see, for example, PTL 1).

FIG. 6 is a perspective view of a split core described in PTL 1. As shown in FIG. 6, a laminated material 21 and laminate 22 are laminated and fixed together using an adhesive, where the laminated material 21 is produced by laminating and caulking magnetic steel sheets while the laminate 22 is produced by laminating plural amorphous sheets and bonding the amorphous sheets using an adhesive.

CITATION LIST

Patent Literature

PTL 1
Japanese Patent Application Laid-Open No. 2014-155347

SUMMARY OF INVENTION

Technical Problem

However, the configuration described in FIG. 6 has a problem that the adhesive is put between layers of amorphous ribbons, resulting in a reduced space factor and reduced motor drive efficiency.

To solve the conventional problem described above, the present invention has an object to provide an iron core and a motor that can prevent reduction in motor drive efficiency.

Solution to Problem

To achieve the above object, the present invention provides an iron core including: a laminate section made up of a lamination of a plurality of ribbons, fixed to a substrate, and provided with a winding section; and a fastening part that pressurizes the laminate section in a lamination direction of the ribbons.

Also, the present invention provides a motor including a rotor; and the iron core.

Advantageous Effects of Invention

The present invention can prevent reduction in motor drive efficiency.

DESCRIPTION OF EMBODIMENTS

Figure 1A:
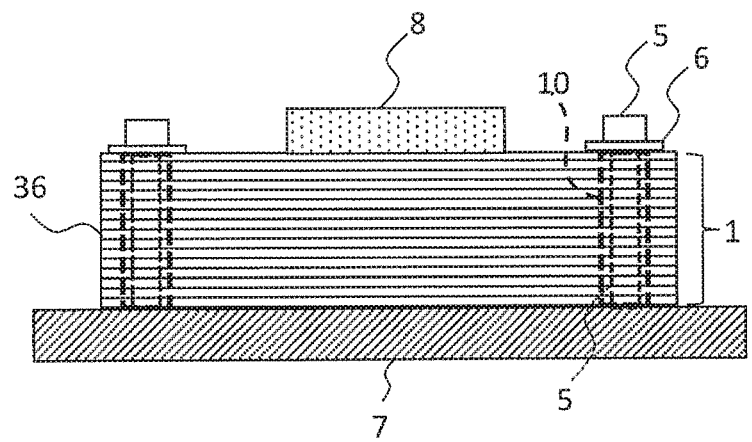
FIG. 1A is a sectional view of a laminate section according to Embodiment 1.

Embodiments of the present invention will be described below with reference to the accompanying drawings. Note that the same components are denoted by the same reference numerals throughout the drawings.

Embodiment 1

Figure 1B:
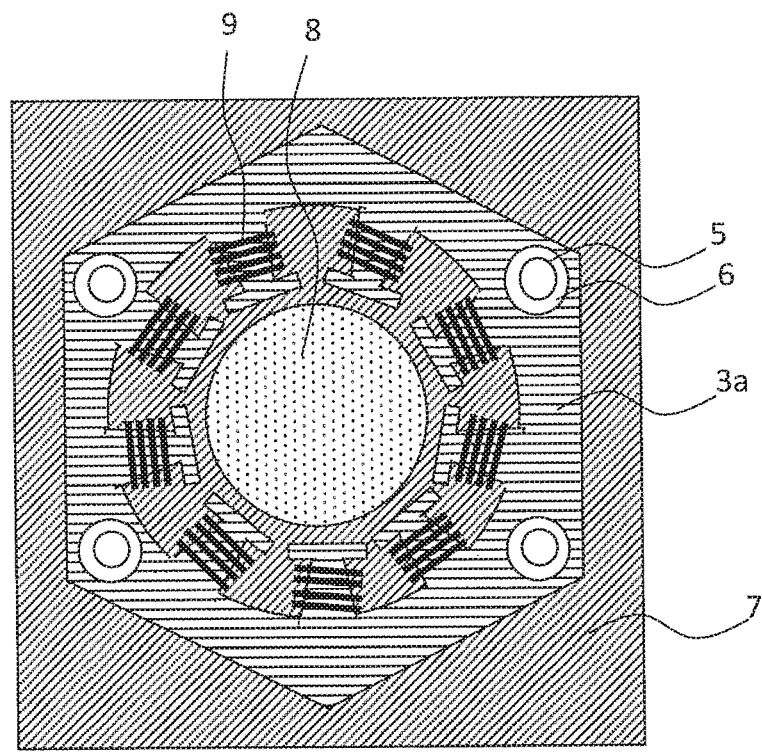
FIG. 1B is a top view of FIG. 1A.

FIG. 1A is a side view showing an iron core according to Embodiment 1 and a motor using the iron core. FIG. 1B is a top view of FIG. 1A. Specifically, FIGS. 1A and 1B show a brushless motor.

The iron core according to the present embodiment includes laminate section 1 and fastening part 6 (this is also true of Embodiments 2 and 3 described later).

Laminate section 1 is a lamination of soft magnetic ribbons 36 (e.g., ribbon core material: an example of ribbons). The thickness of soft magnetic ribbons 36 is, for example, 10 to 60 μm. Examples of materials for soft magnetic ribbons 36 include an iron alloy containing at least one of boron and silicon.

Through-holes 10 are provided in laminate section 1. Bolts 5 are fitted into through-holes 10. Consequently, laminate section 1 is pressed against metal substrate 7 (an example of a substrate) by fastening parts 6, which are washers, and fixed.

Fastening parts 6 fix laminate section 1 by pressurizing laminate section 1 with surfaces of fastening parts 6 in a lamination direction (downward direction in FIGS. 1A and 1B; the same applies hereinafter). An undersurface of each fastening part 6 is placed in contact with a circumferential area of an upper surface (opening) of through-hole 10.

Rotor 8 is provided in an opening portion in the center. As shown in FIG. 1B, windings 9 (an example of a winding section) are provided around rotor 8.

Four through-holes 10 are provided on an outer side of windings 9 (only two through-holes 10 are illustrated in FIG.

1A). Four through-holes 10 are disposed symmetrically to one another. This allows laminate section 1 to be held down uniformly.

In this way, in the present embodiment, laminate section 1 is held by bolts 5, fastening parts 6, and through-holes 10, thereby making disassembling easy and eliminating the need for an adhesive. Since no adhesive is necessary, it is possible to prevent reduction in a space factor as well as reduction in motor drive efficiency. Also, because tightening forces of fastening parts 6 can be adjusted, there is no fear of damaging laminate section 1 and failure of laminate section 1 can be prevented.

Note that bolts 5, fastening parts 6, and through-holes 10 are an example and that another holding mechanism may be used.

Also, through-holes 10 are not essential components, and laminate section 1 may be held down by fastening parts 6 using, for example, outer sides of laminate section 1.

Embodiment 2

Figure 2A:
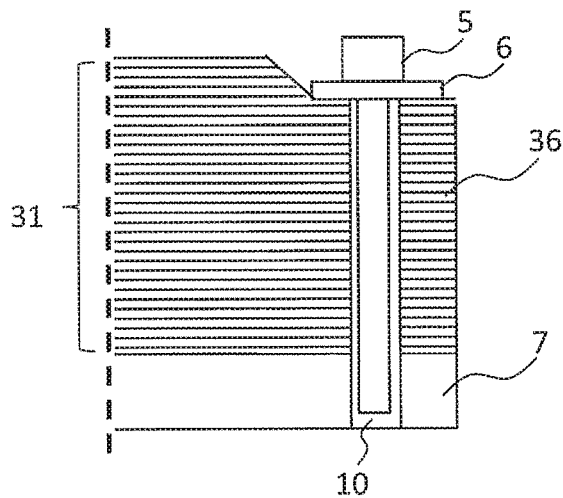
FIG. 2A is a sectional view of a fastening part of the laminate section.
Figure 2B:
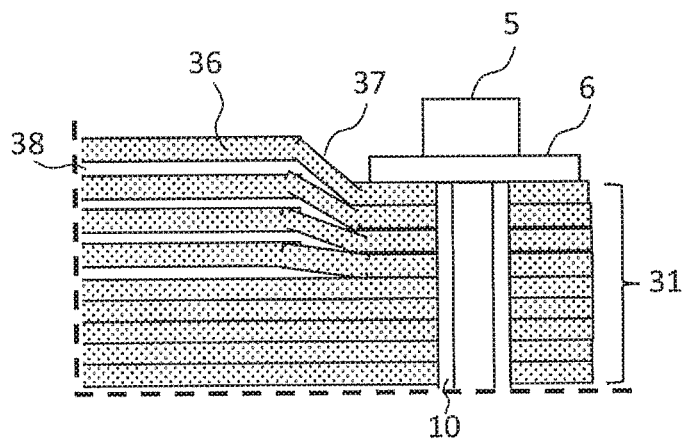
FIG. 2B is a partial enlarged sectional view of FIG. 2A.
Figure 2C:
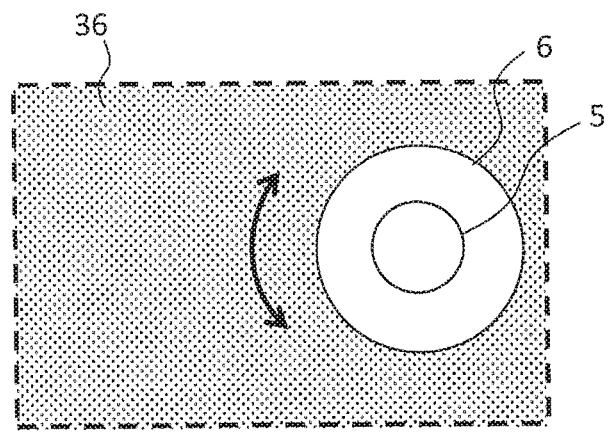
FIG. 2C is a top view of FIG. 2B.

FIGS. 2A to 2C show surroundings of fastening part 6 of laminate section 31 of soft magnetic ribbons 36. FIG. 2A is a sectional view of a neighborhood of fastening part 6, FIG. 2B is an enlarged sectional view of the neighborhood of fastening part 6, and FIG. 2C is an enlarged top plan view of the neighborhood of fastening part 6.

As shown in FIG. 2A, laminate section 31 of soft magnetic ribbons 36 is fixed by bolts 5 reaching through-holes 10 in metal substrate 7. To describe this in detail with reference to FIG. 2B, soft magnetic ribbons 36 fastened by fastening parts 6 come into intimate contact with one another in the lamination direction, leaving no space.

However, because soft magnetic ribbons 36 have low rigidity in areas where soft magnetic ribbons 36 are not constrained by fastening parts 6, soft magnetic ribbons 36 tend to spread by forming gaps 38 as shown in FIG. 2B, in so doing, deformed portions 37 of soft magnetic ribbons 36 are formed around (in a neighborhood of) fastening parts 6 as shown in FIG. 2B. Deformed portions 37 increase in size toward the end of laminate section 31 in the lamination direction.

Also, as shown in FIG. 2C, when bolt 5 is fastened, due to a turning force of fastening part 6, torsion occurs in soft magnetic ribbons 36 in the directions of arrows in FIG. 2C.

When the sum of the deformation and torsion of soft magnetic ribbons 36 described above exceeds a breaking point of soft magnetic ribbons 36, failure such as breakage occurs in soft magnetic ribbons 36. If soft magnetic ribbons 36 fail, a magnetic path during operation of the motor becomes discontinuous in contradiction to design, deteriorating magnetic properties. Also, even if soft magnetic ribbons 36 do not result in failure, due to stresses generated by deformation, magnetic properties are deteriorated.

Measures against these problems will be described below.

Figure 3A:
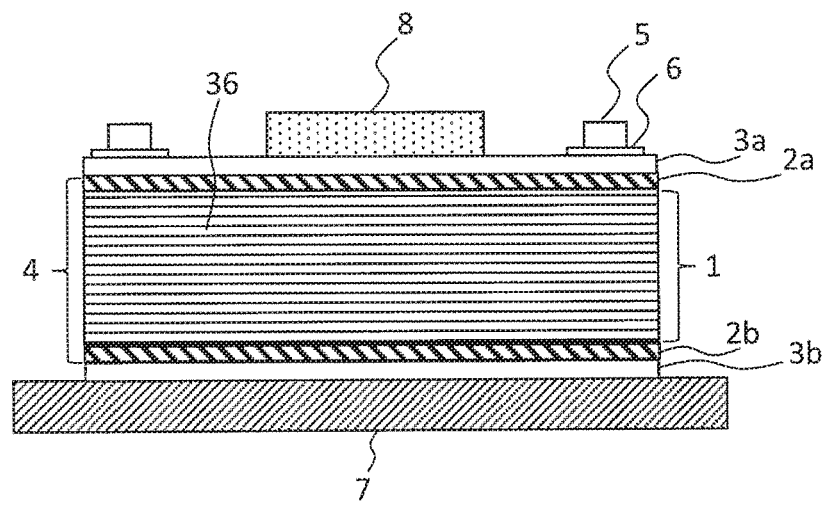
FIG. 3A is a side view of a laminate section and a motor according to Embodiment 2.
Figure 3B:
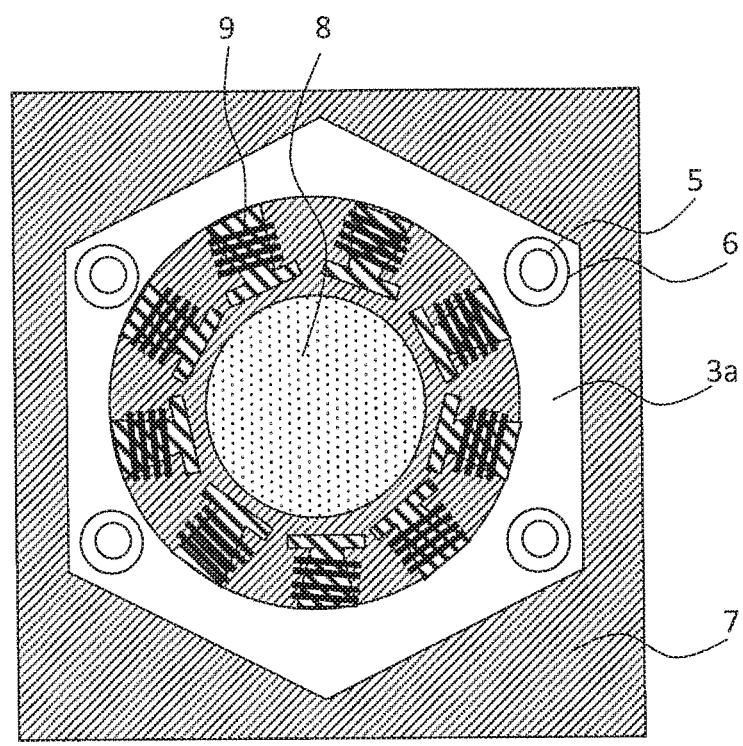
FIG. 3B is a top view of FIG. 3A.

FIG. 3A is a side view showing an iron core according to Embodiment 2 and a motor using the iron core. FIG. 3B is a top view of FIG. 3A.

As shown in FIG. 3A, laminate 4 of magnetic plates includes laminate section 1 made up of a lamination of soft magnetic ribbons 36 containing an amorphous substance or nanocrystal grains and two magnetic steel sheets 2a and 2b that sandwich upper and lower surfaces of laminate section 1 in the lamination direction. Magnetic steel sheet 2a is provided on the side of the upper surface of laminate section 1 and magnetic steel sheet 2b is provided on the side of the undersurface of laminate section 1.

Also, as shown in FIGS. 3A and 3B, two metal plates 3a and 3b that sandwich laminate 4 are provided on upper and lower surfaces of laminate 4 in the lamination direction. Metal plates 3a and 3b are made of austenitic stainless steel sheets.

Laminate 4 configured as described above is fixed to metal substrate 7, for example, by bolts 5, fastening parts 6, and through-holes 10 (not illustrated) as with Embodiment 1.

In laminate section 1, soft magnetic ribbons 36 are laminated without using any adhesive therebetween. The non-use of any adhesive can increase the space factor. The above configuration makes up a stator. By installing rotor 8 in a bore portion of the stator and passing an electric current therethrough, the motor can be operated.

Soft magnetic ribbons 36 will be deformed by stresses acting on the neighborhood of fastening parts 6. To prevent this, rigidity of the upper and lower surfaces of laminate section 1 in the lamination direction can be increased.

Therefore, as shown in FIG. 3A, magnetic steel sheets 2a and 2b and metal plates 3a and 3b are provided on the upper and lower surfaces. The reason why metal plates 3a and 3b are provided on the upper and lower surfaces is that this ensures rigidity compared to when metal substrate 7 is used alone.

Suppose placement positions of magnetic steel sheets 2a and 2b and metal plates 3a and 3b shown in FIG. 3A are exchanged (i.e., metal plates 3a and 3b are provided on the upper and lower surfaces of laminate section 1 and magnetic steel sheets 2a and 2b are provided on the upper and lower surfaces of metal plates 3a and 3b), in teeth portions behind windings 9, gaps are created between magnetic steel sheets 2 and soft magnetic ribbons 36, increasing the total length of windings 9 and thereby increasing copper loss. This results in reduced motor drive efficiency as well as in a structure in which soft magnetic ribbons 36 are prone to failure. The interposition of metal plates 3a and 3b irrelevant to magnetic properties between magnetic steel sheets 2a and 2b and laminate section 1 also degrades the motor drive efficiency. Besides, in the teeth portions behind windings 9, gaps are created between magnetic steel sheets 2 and soft magnetic ribbons 36, resulting in reduced motor drive efficiency as well as in a structure in which soft magnetic ribbons 36 are prone to failure. Thus, as shown in FIG. 3A, the configuration in which magnetic steel sheets 2a and 2b are provided on the upper and lower surfaces of laminate section 1 and metal plates 3a and 3b are provided on the upper and lower surfaces of magnetic steel sheets 2a and 2b is preferable.

Note that either magnetic steel sheets 2a and 2b or metal plates 3a and 3b may be provided. Whereas description has been given above by taking as an example a configuration in which magnetic steel sheets 2a and 2b are provided, this configuration is intended to prevent winding pressure of windings 9 from acting directly on corner portions of laminate section 1, making soft magnetic ribbons 36 prone to failure, starting from the corner portions and the like. Thus, if there is no concern about failure and the like caused by windings 9, magnetic steel sheets 2a and 2b may be omitted.

<Magnetic Steel Sheets 2a and 2b>

Now, magnetic steel sheets 2a and 2b will be described further.

Magnetic steel sheets 2a and 2b, which are made of the same soft magnetic material as soft magnetic ribbons 36, keep magnetic properties of laminate 4 from deteriorating. Board thickness of magnetic steel sheets 2 is typically 0.35 mm to 0.5 mm in the case of products available on the market. Under the current circumstances, magnetic steel sheets 2 with a thickness of about 0.15 mm are also on the market, but are expensive. Therefore, there are constraints on the board thickness of magnetic steel sheets 2.

Whether or not soft magnetic ribbons 36 fail depends on the magnitude of fastening power. When the fastening power is great, preferably magnetic steel sheets 2a and 2b are provided on the upper and lower surfaces of laminate section 1, respectively to prevent failure by increasing rigidity. Furthermore, it is preferable to provide plural magnetic steel sheets 2a and plural magnetic steel sheets 2b.

Preferably, soft magnetic ribbons 36 are made of a nanocrystal material resulting from crystallization of an amorphous material, the nanocrystal material being superior in magnetic properties to the amorphous material. However, when the nanocrystal material, which is more brittle than the amorphous material, is used for soft magnetic ribbons 36, further breakage prevention measures are needed.

Metal plates 3a and 3b, which do not have thickness constraints, can be provided one on the upper surface, and the other on the lower surface. In contrast, although magnetic steel sheets 2a and 2b are soft magnetic bodies as with soft magnetic ribbons 36, magnetic steel sheets 2a and 2b are subject to larger eddy current losses than soft magnetic ribbons 36 whose board thickness is as small as approximately 1/10 that of magnetic steel sheets 2a and 2b. Thus, if plural magnetic steel sheets 2a and plural magnetic steel sheets 2b are incorporated into the motor, the motor drive efficiency might be reduced. Therefore, when it is desired to give priority to the motor drive efficiency, preferably, the number of both magnetic steel sheets 2a and 2b is minimized.

Thus, in terms of thickness, preferably a magnitude relationship among soft magnetic ribbon 36, magnetic steel sheet 2a (2b), and metal plate 3a (3b) satisfies equation 1 below.

$$\text{Soft magnetic ribbon 36} < \text{magnetic steel sheet } 2a \leq \text{metal plate } 3a \quad \text{Equation 1}$$

In relation to rigidity, Young's modulus is 130 GPa in the case of magnetic steel sheets 2a and 2b, and 193 GPa in the case of austenitic stainless steel (metal plates 3a and 3b). Thus, the austenitic stainless steel (metal plates 3a and 3b) has the advantage that there is no need to be as thick as magnetic steel sheets 2a and 2b in order to offer the same rigidity as magnetic steel sheets 2a and 2b.

Preferably, metal plates 3 are higher in rigidity than magnetic steel sheets 2. Thus, in terms of rigidity, preferably a magnitude relationship among soft magnetic ribbon 36, magnetic steel sheet 2a (2b), and metal plate 3a (3b) satisfies equation 2 below.

$$\text{Soft magnetic ribbon 36} < \text{magnetic steel sheet } 2a < \text{metal plate } 3a \quad \text{Equation 2}$$

<Metal Plates 3a and 3b>

Now, metal plates 3a and 3b will be described further.

Figure 4:
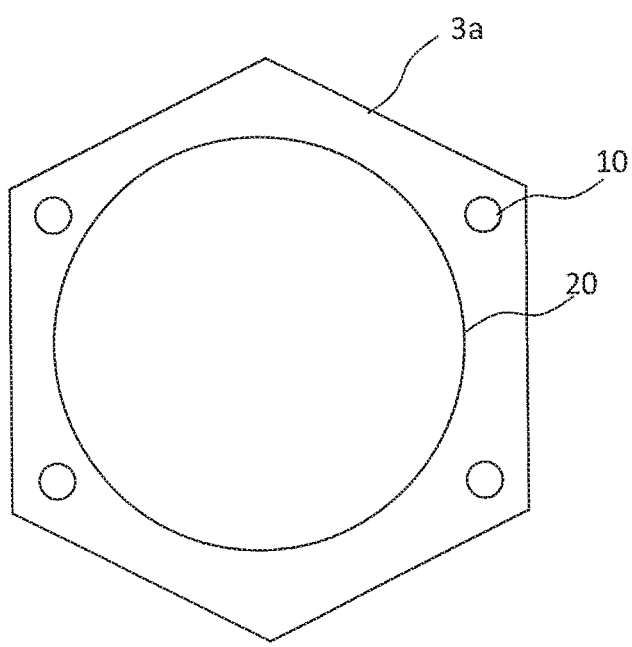
FIG. 4 is a top view of a metal plate in the laminate section according to Embodiment 2.

FIG. 4 is a top view of metal plate 3a. Metal plate 3a shown in FIG. 4 will be described below, but description also applies to metal plate 3b.

Metal plate 3a is annular in shape. Metal plate 3a has the same external shape as soft magnetic ribbons 36 (laminate section 1) and magnetic steel sheets 2 because if metal plate 3a projects outward from soft magnetic ribbons 36 (laminate section 1) and magnetic steel sheets 2, metal plate 3a will interfere with other parts during the assembly of the motor.

Four through-holes 10 are provided in metal plate 3a to allow passage of fastening bolts 5. Also, through-hole 20 is provided in the center of metal plate 3a to allow passage of rotor 8 (see FIG. 3B). Through-hole 20 is sized such that windings 9 shown in FIG. 3B will not be covered.

When metal plate 3a is shaped so as not to cover windings 9 in this way, the length required for windings 9 is reduced by twice the product of the board thickness of metal plate 3 and the number of turns compared to when metal plate 3a covers windings 9. Copper loss (Joule heat generated by an electric current flowing through a copper wire) increases with increases in the length of windings 9. Therefore, when metal plate 3a is shaped so as not to cover windings 9, copper loss is reduced, improving motor drive efficiency.

Nonmagnetic, austenitic stainless steel is used as a material of metal plate 3a as described above so as not to affect magnetism. If the contact area between metal plate 3a and soft magnetic ribbon 36 is larger than the contact area between fastening parts 6 and metal plate 3a, stresses concentrating on the neighborhoods of fastening parts 6 can be dispersed.

Embodiment 3

Figure 5A:
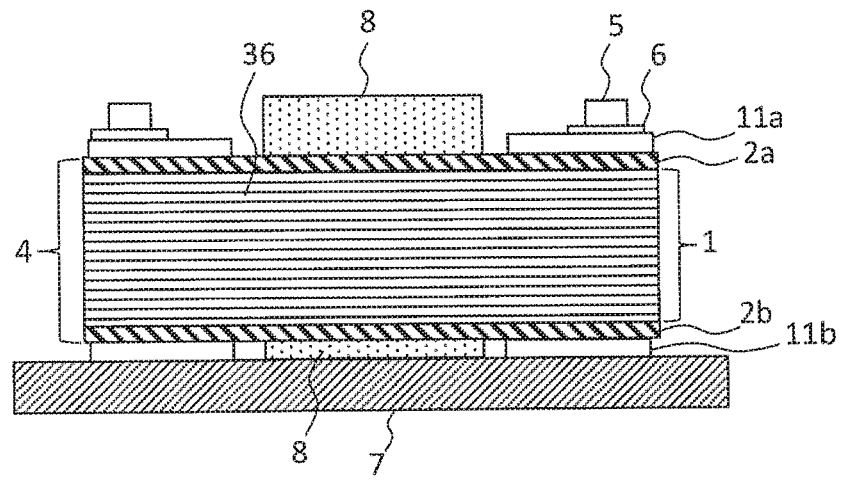
FIG. 5A is a side view of a laminate section and a motor according to Embodiment 3.
Figure 5B:
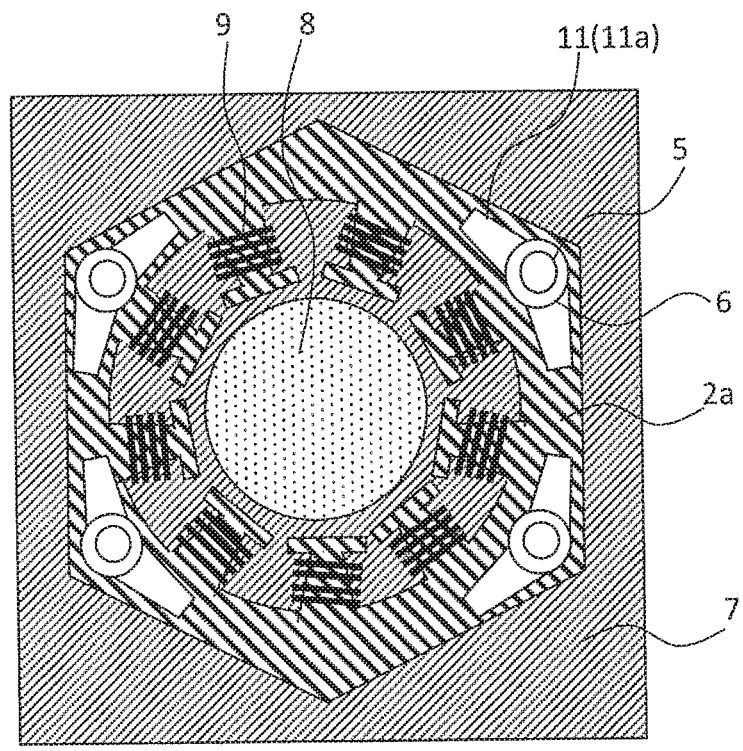
FIG. 5B is a top view of FIG. 5A.
Figure 6:
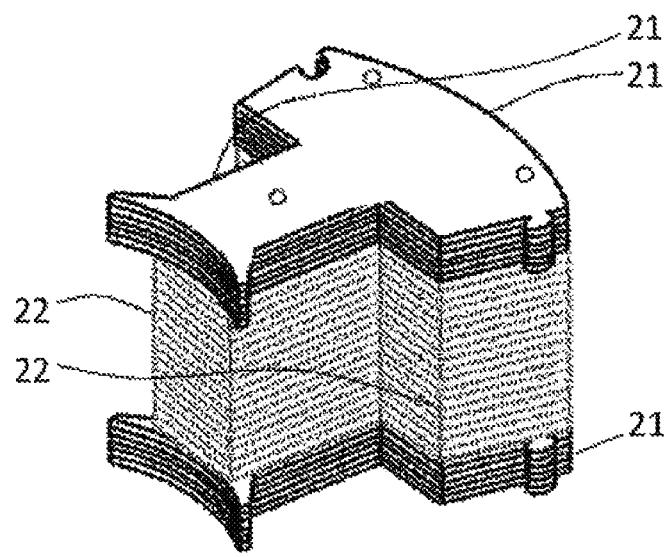
FIG. 6 is a perspective view showing a structure of a conventional split core described in PTL 1.

FIG. 5A is a side view showing an iron core according to Embodiment 3 and a motor using the iron core. FIG. 5B is a top view of FIG. 5A.

The configuration shown in FIGS. 5A and 5B differs from the configuration of Embodiment 2 (configuration shown in FIGS. 3A and 3B) in that separate metal plates 11a and separate metal plates 11b corresponding to respective ones of four fastening parts 6 are provided. Metal plates 11a are provided on the side of an upper surface of magnetic steel sheet 2a while metal plates 11b are provided on the side of an undersurface of magnetic steel sheet 2b.

Preferably, the area of one metal plate 11a is at least twice as large as the area of one fastening part 6. However, the contact area between metal plate 11a and laminate 4 (magnetic steel sheet 2a) has to be larger than the contact area between metal plate 11a and fastening part 6. The reason for this is any metal plate 11a existing at a location away from fastening part 6 does not provide a large effect because stresses generated in the neighborhood of fastening part 6 decrease rapidly with distance from fastening part 6.

Preferably, each metal plate 11a is shaped to be symmetrical with respect to fastening part 6 to ensure symmetrical stress distribution.

Each metal plate 11b may be shaped similar to metal plate 11a.

Note that whereas description has been given of a case in which metal plates 11a and 11b are provided, respectively, on the upper and lower surfaces of laminate section 1 in the lamination direction as shown in FIG. 5A, metal plates 11a or metal plates 11b may be provided on only either one of the surfaces.

Also, metal plate 3 described in Embodiments 1 and 2 may be used instead of metal plates 11a or metal plates 11b.

As described above by providing separate metal plates 11a and separate metal plates 11b under respective fastening parts 6, the present embodiment allows a volume occupied by metal plates 11a and 11b in the motor to be reduced, securing extra space for other mounting parts. Also, the present embodiment provides the effect of increasing material yields during production of products and thereby reducing parts unit prices. Furthermore, because there is no interaction among individual metal plates 11a (or among individual metal plates 11b), no excessive stress acts on laminate 4.

Embodiments 1 to 3 of the present invention have been described above, but the present invention is not limited to Embodiments 1 to 3 described above, and various modifications are possible without departing from the spirit of the invention.

INDUSTRIAL APPLICABILITY

The iron core according to the present invention is useful as the stators of motors. Furthermore, in addition to motors, the iron core according to the present invention is also applicable to electronic components, such as transformers, which use applied magnetics.

REFERENCE SIGNS LIST 1, 31 Laminate section
2a, 2b Magnetic steel sheet
3a, 3b, 11a, 11b Metal plate
4 Laminate
5 Bolt
6 Fastening part
7 Metal substrate
8 Rotor
9 Winding
10, 20 Through-hole
21 Laminated material
22 Laminate
36 Soft magnetic ribbon
37 Deformed portion
38 Gap

The invention claimed is:

1. An iron core comprising:
a laminate section made up of a lamination of a plurality of ribbons, fixed to a substrate, and provided with a winding section;
a fastening part that pressurizes the laminate section in a lamination direction of the ribbons;
a metal plate located between the laminate section and the fastening part, and
a magnetic steel sheet located between the laminate section and the metal plate.

2. The iron core according to claim 1, wherein the fastening part is disposed around an opening of a through-hole that penetrates the laminate section.

3. The iron core according to claim 1, wherein the metal plate is made of a nonmagnetic steel sheet.

4. The iron core according to claim 1, wherein a contact area between the metal plate and the laminate section is larger than a contact area between the metal plate and the fastening part.

5. The iron core according to claim 1, wherein the metal plate is annular in shape.

6. The iron core according to claim 1, wherein the shape of the metal plate exists only around the fastening part.

7. The iron core according to claim 1, wherein a plurality of the metal plates is provided, fixing the laminate section from one side in the lamination direction of the ribbons.

8. The iron core according to claim 1, wherein a plurality of the fastening parts is provided, the fastening parts being arranged symmetrically with respect to a center of the iron core.

9. The iron core according to claim 1, wherein a plurality of the metal plates is provided, fixing the laminate section from both sides in the lamination direction of the ribbons.

10. The iron core according to claim 1, wherein a plurality of the magnetic steel sheets is provided, fixing the laminate section from both sides in the lamination direction of the ribbons.

11. The iron core according to claim 1, wherein the metal plate is a material having a larger modulus of rigidity than the magnetic steel sheet.

12. A motor comprising:
a rotor; and
the iron core according to claim 1.

13. The iron core according to claim 1, wherein the metal plate has such a shape as not to cover the winding section.

14. The iron core according to claim 1, wherein
the plurality of ribbons are soft magnetic ribbons,
a thickness of the magnetic steel sheet is larger than a thickness of each of the soft magnetic ribbons, and
a thickness of the metal plate is larger than or equal to the thickness of the magnetic steel sheet.

15. The iron core according to claim 1, wherein
the plurality of ribbons are soft magnetic ribbons,
rigidity of the magnetic steel sheet is larger than rigidity of each of the soft magnetic ribbons, and
rigidity of the metal plate is larger than the rigidity of the magnetic steel sheet.

* * * * *